United States Patent [19]

Rogge et al.

[11] 4,421,672

[45] Dec. 20, 1983

[54] METHOD OF CYCLIC DESORPTION OF ADSORPTION MEDIA LOADED WITH ADSORBATES

[75] Inventors: Karl Rogge, Leihgestern; Günther Gappa, Gelsenkirchen-Buer, both of Fed. Rep. of Germany

[73] Assignee: Bergwerksverband GmbH, Essen, Fed. Rep. of Germany

[21] Appl. No.: 311,301

[22] Filed: Oct. 14, 1981

[30] Foreign Application Priority Data

Oct. 14, 1980 [DE] Fed. Rep. of Germany ....... 3038715

[51] Int. Cl.³ .................... B01J 20/34; B01D 53/04
[52] U.S. Cl. ................................. 502/55; 55/59; 55/74; 55/75; 585/826; 502/20
[58] Field of Search ............... 252/411 R, 411 S, 420; 55/59, 62, 74, 75

[56] References Cited

U.S. PATENT DOCUMENTS

| | | | |
|---|---|---|---|
| 2,114,810 | 4/1938 | Ray | 252/420 |
| 3,216,178 | 11/1965 | Sauty | 55/62 |
| 3,685,256 | 8/1972 | Barrere, Jr. | 55/74 |
| 4,128,405 | 12/1978 | Frohreich et al. | 55/71 |

FOREIGN PATENT DOCUMENTS

188723  11/1922  United Kingdom ............... 252/420

*Primary Examiner*—P. E. Konopka
*Attorney, Agent, or Firm*—Michael J. Striker

[57] ABSTRACT

A method of cyclic desorption of adsorption agents cyclically loaded with adsorbates is performed in two phases in which a mixture of a desorption vapor and an adsorption vapor is guided over an adsorption medium in a first adsorption phase, a pure desorption vapor is guided over an adsorption medium in a second adsorption phase, and a vapor mixture produced during the second adsorption phase is introduced into the first adsorption phase.

8 Claims, 3 Drawing Figures

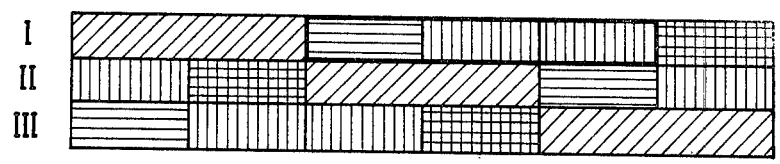
FIG. 2
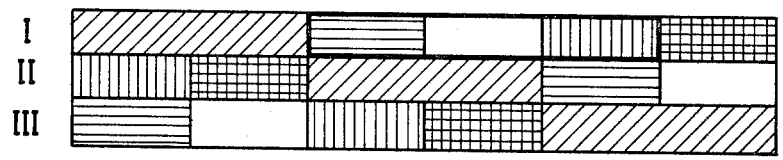
FIG. 3
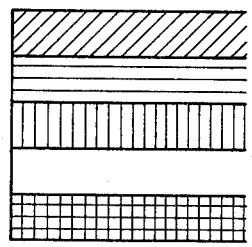
ABSORBING
DESORBING WITH VAPOR MIXTURE
DESORBING WITH WATER VAPOR
DESORPTION INTERRUPTION
DRYING AND COOLING

METHOD OF CYCLIC DESORPTION OF ADSORPTION MEDIA LOADED WITH ADSORBATES

BACKGROUND OF THE INVENTION

The present invention relates to a method of cyclic desorption of adsorption media cyclically loaded with adsorbates.

Because of the requirements of the environmental protection with respect to retaining the air and water clean, it is important for the future to make exhaust gas or water streams having low concentration of for example solvent or solvent vapors or other gaseous or liquid deleterious substances, such as nitrogen oxides, phenols, and other adsorbates, free from these admixtures. The same is true with respect to removal of hydrocarbons from natural gases, for example casing-head gas or oil gas, and also for cleaning technical gases, such as for example a synthetic gas.

The recovery or regeneration of these admixtures (adsorbates) is performed in cleaning devices suitable for alternating adsorption and desorption on activated carbon with one or several respectively connected reactors. The most consuming step in this process is the desorption of the adsorbate by a vapor (desorption vapor), as a rule water vapor or nitrogen.

Arrangements for regeneration of such adsorbates, for example of solvents with activated carbon arranged in a firm bed, are composed of at least two reactors which make possible removal of the solvent in alternative order between adsorption and desorption uninterruptedly from the gas phase, the reactors being alternately turned on for the adsorption and the desorption. The dimensions of the reactors must be selected as a rule in accordance with the requirements made to the adsorption, wherein the volume stream of the gas phase to be cleaned determines the cross section of the reactor. Since the volume stream of the desorption vapor utilized for desorption is considerably smaller than the volume stream of the gas phase to be treated, the vapor speed during the desorption in the activated carbon bed amounts only to several cm/s.

For drying and cooling of the adsorption medium (in the case of adsorption from the gaseous phase) which as a rule follows the desorption, the moisture repellancy of the utilized adsorption medium determines the physical properties of the adsorbate and the requirements of the individual case. As a rule, the drying and cooling of the desorbed adsorption medium is performed by fresh air which is guided by a blower via a heat exchanger into the cycle. Moreover, it is possible, in the event of air cooling, to exhaust air after exiting from the reactor to be cooled into the atmosphere. Also an inert gas can be utilized, instead of air, as a cooling medium.

In the time sequence in the arrangement with drying and cooling cycle, the adsorption time and the regeneration time are comparable with one another, wherein the regeneration time embraces the time for desorption, drying and cooling.

The process of the conventional desorption of the activated carbon, for example with water vapor, starts in a substantially slow yield (in addition to possible overflowing water vapor) from condensates which are composed in the beginning from the desorbed adsorbate, and later from water. Then only a mixture of adsorbate-vapor and water vapor exits from the reactor, wherein in the middle of the conventional desorption time a ratio of adsorbate-vapor to water vapor is adjusted to 1:1 and in the second half of the desorption time to a ratio of approximately 1:10. This means that by this time point 10 kg of water vapor is needed for desorption of 1 kg of adsorbate. Thereby the vapor consumption is so high that the effective desorption no longer takes place.

The known desorption methods possess considerable disadvantages. The alternating utilization of the reactor or reactors for adsorbing and desorbing leads, because of the dimensioning of the reactor size upon the requirements made to the adsorption, in the event of desorption to very small vapor speed. A uniform action upon the activated carbon bed with water vapor is in question, especially when relatively great reactor sections are treated with small layer heights in comparison with the former. Moreover, the requirement to utilize economically the vapor quantity leads to limiting the desorption to an increased rest loading and thereby to reduced loading ability in the next cycle and, as a result, to a reduced utilization of the adsorption property of the activated carbon accommodated in the reactor.

SUMMARY OF THE INVENTION

Accordingly, it is an object of the present invention to provide a method of cyclic desorption of adsorption agents loaded with adsorbates, which avoids the disadvantages of the prior art.

More particularly, it is an object of the present invention to provide a method of cyclic desorption of adsorption agents loaded with adsorbates, which with the smallest possible quantity of a desorption vapor, improves the desorption of the adsorbate and better utilizes the condensation energy of desorption vapor.

In keeping with these objects, and with others which will become apparent hereinafter, one feature of the present invention resides, briefly stated, in a method of cyclic desorption of adsorption agents cyclically loaded with adsorbates by a vapor, which includes a first desorption phase performed by guiding a mixture of a desorption vapor and an adsorption vapor over an adsorption medium, the second phase including guiding of a pure desorption vapor over an adsorption medium, and introduction of a vapor mixture produced during the second adsorption phase into the first adsorption phase.

Because of the utilization of the vapor mixture produced in the second desorption phase as a vapor mixture guided over the adsorption medium in the first desorption phase, the water vapor utilization is reduced in condition of practically the same quality and intensity of the process, and the condensation energy of the vapor mixture produced at the end of the desorption step is usefully brought into the desorption process again.

When a single reactor filled with the adsorption medium for performing adsorption/desorption is utilized, the vapor mixture produced during the second desorption phase must be stored intermediately for the introduction into the first desorption phase of the next desorption cycle. The temperature, pressure and flow conditions of the mixture to be utilized in the first desorption phase differ, as a rule, only insignificantly from the conditions of the quantities of for example water vapor utilized in the prior art.

The condensation energy of the vapor mixture produced in the first desorption phase as condensate, acts for a temperature increase of the adsorption medium which continues until the condensation temperature is overcome. The introducible quantity of a pure desorption vapor (second desorption phase) is particularly small when, in accordance with another advantageous feature of the present invention, the second desorption phase starts no later than when no more condensate is produced in the first desorption phase.

In accordance with further features of the present invention, the adsorption medium is cooled prior to a new adsorption step. Also, at least three adsorption/desorption reactors filled with the adsorption medium can be utilized. This provides for fast and complete repeated insertion of the adsorption medium after the performed desorption. The utilization of at least three reactors provides not only for continuous operation, but also attains a time and heat recovery, inasmuch as the consuming intermediate stage of the vapor mixture produced in the second desorption step is avoided.

Single or repeated interruption of one or both desorption phases may also be performed and provides for a further reduction of the desorption vapor consumption. During the interruption there remains the desorption vapor or desorption mixture introduced in the reactor for such a long time in the adsorption medium bed until a concentration of the adsorbate in the water vapor takes place, whereupon the water vapor or vapor mixture introduced in the intervals again produces a sufficient concentration drop. It has been found that a concentration drop of sufficient value is required not only for removal of the desorbed adsorbate from the adsorption medium bed and transportation of the same out of the reactor, but also out of the pores of the adsorption medium in to the surrounding space. It is to be understood that the above-mentioned features can also take place when the desorption, as is conventional in the prior art, is performed in a single phase.

The inventive method can be carried out with different adsorption media including molecular sieves, zeolites and the like. It is however especially advantageous when activated carbon is utilized as adsorption medium, and first of all in connection with the solvent medium recovery.

In the process of desorption, the ratio between the adsorbate and the desorption vapor changes in direction to an adsorbate-depleted vapor mixture, whereas the heat content of the vapor mixture changes in direction to the heat content of the pure desorption vapor. The switching to the second desorption phase takes place advantageously during the second half, advantageously during the last third of the entire desorption time.

In accordance with still a further feature of the present invention, one or several intermediate desorption phases take place between the first and second desorption phase. This provides for a special energy-economical recovery of the adsorbate and also for the intensification of the desorption. Moreover, this makes easier a particularly time-favorable assembling of for example more than two adsorption/desorption reactors filled with the adsorption medium. With these intermediate desorption phases, a pure desorption vapor is advantageously guided over the adsorption medium, and the produced vapor mixture is supplied to a condensation device.

The novel features which are considered characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

FIG. 2 is a view schematically showing a diagram for the arrangement of FIG. 1; and FIG. 3 is a view schematically showing the arrangement of FIG. 1 with interruption of the desorption steps.

DESCRIPTION OF THE PREFERRED EMBODIMENTS

Figure 1:
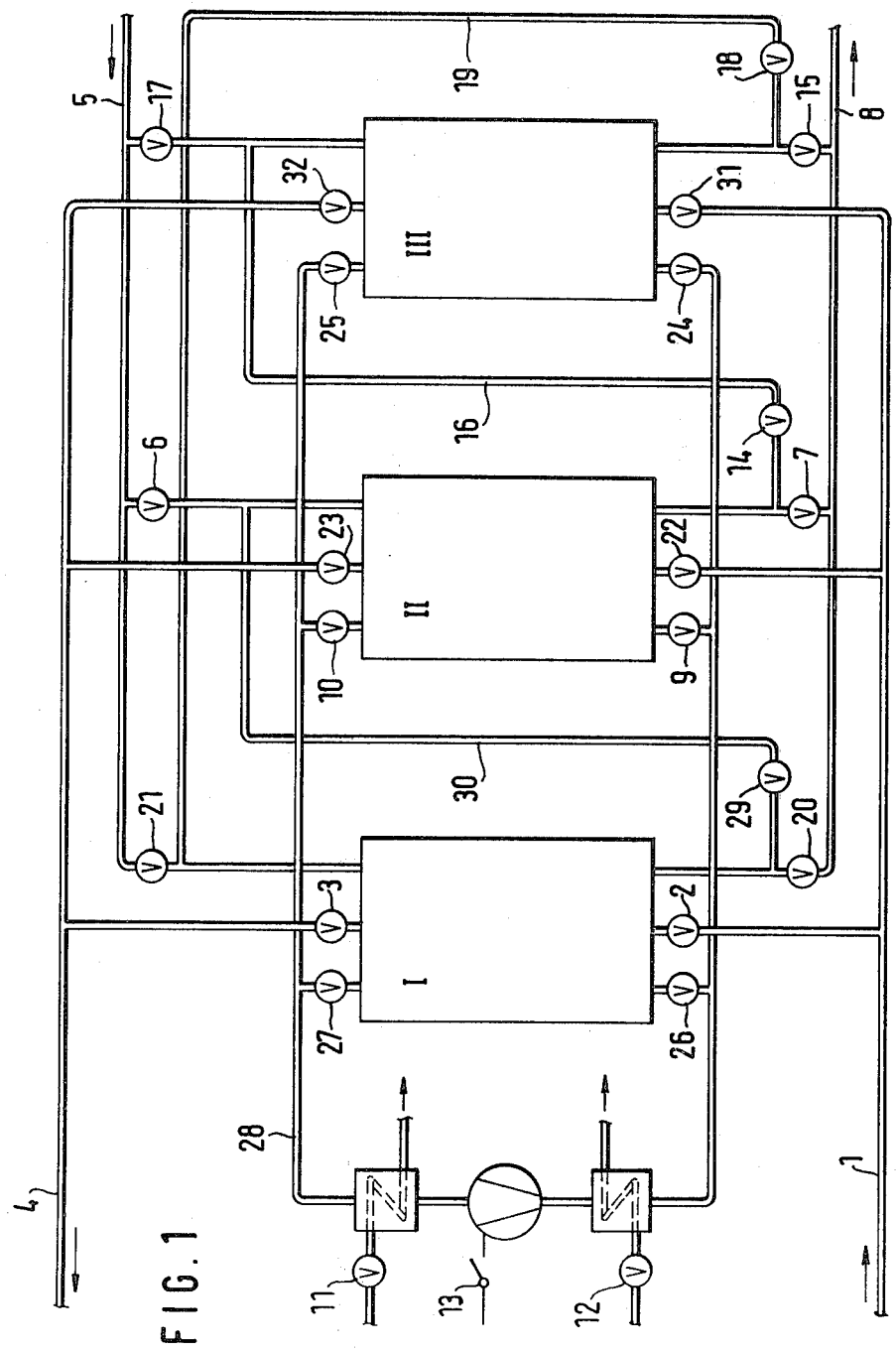
FIG. 1 is a view schematically showing an arrangement for adsorption/desorption with three adsorption reactors for recovery of a solvent from exhaust gas.

An inventive method and an arrangement for carrying out the same are illustrated in FIG. 1, wherein all valves are shown in closed positions unless otherwise indicated in the description. An exhaust gas loaded with for example a solvent vapor flows via a conduit 1 with open valves 2 and 3 through a reactor I containing an adsorption medium bed and leaves the arrangement via a conduit 4. Simultaneously, a reactor II which is filled with the same adsorption medium with which the reactor I is filled, is in the second desorption phase in which the water vapor flows via a conduit 5 with open valves 6 and 14 into the reactor II. It leaves the reactor II as vapor mixture of for example water vapor and solvent medium vapor via a conduit 16. In the same time sequence, the vapor mixture is guided from the reactor II into the reactor III which is filled in the same manner as the reactors I and II, for desorption over the activated carbon. Thereupon, condensed and covered solvent medium and vapor mixture leaves the arrangement via an open valve 15 and a conduit 8.

During the second half of the adsorption phase in the reactor I, the desorbed adsorption medium bed is first dried in the reactor II with air introduced into the cycle by a blower turned on by a switch 13 in condition of open valves 9 and 10 as well as open cooling water valve 11 and hot vapor valve 12. After closing of the valve 12, the desorbed and dried adsorption medium bed is finally cooled. During this time, the reactor III carries out an intermediate desorption phase with water vapor with open valves 17 and 15.

After this, the first desorption phase is carried out in the reactor I in which with an open valve 18 the vapor mixture is guided from the reactor II (with pure desorption vapor rinsed with open valves 17 and 15) via a conduit 19 to desorption of the activated carbon in the reactor I. The solvent condensate leaves with an open valve 20 the arrangement via the conduit 8. During this time, the reactor II is turned on to adsorption. Thereupon the desorption takes place in the reactor I with open valves 21 and 20, with pure desorption vapor (intermediate desorption phase) whereas the reactor III is dried and cooled so that the drying and cooling takes place with open valves 24 and 25, as described with respect to the reactor II. In the same time sequence the reactor II carries out the adsorption, for example of the solvent out of the exhaust air with open valves 22 and 23.

Finally, the second desorption phase takes place in the reactor I with open valves 21 and 29. The vapor mixture for desorption in the reactor II is guided over via a conduit 30 and leaves the same, together with the condensate, via the conduit 8 with an open valve 7. Thereafter, the adsorption medium of the reactor I is dried and cooled by air introduced into the cycle via a conduit 28 with open valves 26 and 27. It is performed similarly to the respective steps in the reactor II. At this time, the desorption of the desorption vapor with open valves 6 and 7 expires in the reactor II. During both latter mentioned time periods, the adsorption steps take place in the reactor III with open valves 31 and 32. The above described process is graphically illustrated in FIG. 2. During the first desorption phase, the condensate of solvent and desorption vapor, later also a vapor mixture, are brought to a condensation and cooling. During the intermediate phase of desorption, the desorption with fresh desorption vapor continues. The thus produced vapor mixture composed of desorption vapor and for example solvent vapor is brought directly to the condensation and cooling. In the second phase, the desorption is also performed with fresh desorption vapor, wherein the thus produced desorption vapor depleted of solvent is supplied to the reactor arranged further in the desorption path.

EXAMPLE

In the known regeneration of toluol from 7.200 m$^3$ exhaust air/h with a toluol concentration of 10 g/m$^3$ in an arrangement with three reactors with 2 m$^2$ flow face per reactor, the specific vapor consumption amounts to 3.5 kg/kg toluol. With the series connection of two reactors in desorption path in accordance with the present invention, graphically illustrated in FIG. 2, the solvent can be desorbed with less vapor so that the specific vapor consumption is lowered to 2.8 kg/kg solvent.

FIG. 3 graphically shows the process of adsorption with interruption and connection in series in the desorption path. The consideration of the desorption in the reactor I (shown in FIG. 3 as the strongly encircled field) shows the features of the connection in series and the interruption and allows to recognize the special advantages of this operational type. In accordance with the operation shown in FIG. 3, the fresh desorption vapor is introduced in the reactor I only in the second desorption phase, and a vapor mixture strongly depleted of the solvent is supplied from the reactor I to the reactor 2 located thereafter in the desorption path (for the first desorption phase). In this operational type, the specific vapor consumption for regeneration of toluol in the above-described arrangement with three reactors amounts to 2.4 kg/kg solvent.

It will be understood that each of the elements described above, or two or more together, may also find a useful application in other types of constructions differing from the types described above.

While the invention has been illustrated and described as embodied in a method of cyclic desorption of adsorption agents loaded with adsorbates, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A method of cyclic desorption of activated carbon cyclically loaded with adsorbates by a vapor, comprising the steps of performing a first desorption phase by guiding a mixture of a desorption vapor and an adsorption vapor over activated carbon; performing a second desorption phase by guiding a pure desorption vapor over said activated carbon; introducing the vapor mixture produced during the second desorption phase as said mixture into the first desorption phase; at least once interrupting the passage of the mixture of a desorption vapor over said activated carbon so that a substantially increased concentration of the adsorbate vapor in said desorption vapor and removal of the desorbed adsorbate out of the pores of the activated carbon is effected; and resuming the flow of said desorption vapor over said activated carbon to continue said desorption.

2. A method as defined in claim 1, wherein said step of performing the second desorption phase includes starting the second desorption phase no later than when no more condensate is produced in the first desorption phase.

3. A method as defined in claim 2; and further comprising the step of drying said activated carbon after ending of the second desorption phase.

4. A method as defined in claim 3; and further comprising the step of cooling said activated carbon prior to a new adsorption step.

5. A method as defined in claim 1, wherein said performing steps include utilizing of at least three adsorption/desorption reactors filled with said activated carbon.

6. A method as defined in claim 1, wherein said performing steps include utilizing a water vapor as the desorption vapor.

7. A method as defined in claim 1; and further comprising the step of performing a plurality of such further desorption phases between said first and second desorption phases.

8. A method as defined in claim 1; and further comprising the step of performing at least one further desorption phase between said first and second desorption phases.

* * * * *